United States Patent
Schaetzle et al.

(10) Patent No.: US 6,593,405 B1
(45) Date of Patent: Jul. 15, 2003

(54) METHOD FOR ELASTIFYING AND EXTENDING POLYMERS WITH PVC-HOMO-AND COPOLYMERS OR WITH EVA-COPOLYMERS IN GEL FORM

(75) Inventors: Michael Schaetzle, Walldorf (DE); Gabriele Bride, Nussloch (DE); Gisbert Kern, Mannheim-Feudenheim (DE); Wolfgang Lepka, Heidelberg (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/554,061

(22) PCT Filed: Oct. 30, 1998

(86) PCT No.: PCT/EP98/06890

§ 371 (c)(1), (2), (4) Date: Jul. 25, 2000

(87) PCT Pub. No.: WO99/24494

PCT Pub. Date: May 20, 1999

(30) Foreign Application Priority Data

Nov. 10, 1997 (DE) .......................................... 197 49 554

(51) Int. Cl.⁷ .................................................. C08J 3/18
(52) U.S. Cl. ...................... 524/158; 524/230; 524/588; 524/849; 524/850; 524/853; 524/859; 524/860; 524/869; 524/871; 525/104
(58) Field of Search .............................. 524/158, 230, 524/588, 849, 850, 853, 859, 860, 869, 871; 525/104

(56) References Cited

U.S. PATENT DOCUMENTS

| | | | | |
|---|---|---|---|---|
| 3,896,069 A | * | 7/1975 | Kosaka et al. | |
| 4,025,274 A | * | 5/1977 | Uemura et al. | 425/376 |
| 4,636,552 A | * | 1/1987 | Gay et al. | 525/63 |
| 5,373,042 A | | 12/1994 | Bride et al. | 524/230 |
| 5,776,993 A | * | 7/1998 | Shin et al. | 521/140 |
| 6,025,070 A | * | 2/2000 | Heederik et al. | 428/343 |

FOREIGN PATENT DOCUMENTS

| | | |
|---|---|---|
| CA | 1336215 | 7/1995 |
| DE | 38 16 808 | 10/1989 |
| DE | 40 19 074 | 7/1991 |
| EP | 0 295 727 | 5/1988 |
| JP | 87/64881 | 3/1987 |
| JP | 07197010 | 8/1995 |

OTHER PUBLICATIONS

DIN No. 52455 Aug. 1998.
DIN No. 524584 Apr. 1987.
DIN No. 18545E Mar. 1995.
DIN No. 52456 May 1976.
DIN No. 18540 Feb. 1995.

* cited by examiner

*Primary Examiner*—Margaret Medley
(74) *Attorney, Agent, or Firm*—Stephen D. Harper; Daniel S. Ortiz

(57) ABSTRACT

Methods for elastifying and extending polymers with EVA copolymers, PVC homopolymers or PVC copolymers in gel form are described. The elastified and extended polymers are useful as sealing materials, adhesives and sealants.

20 Claims, No Drawings

METHOD FOR ELASTIFYING AND EXTENDING POLYMERS WITH PVC-HOMO-AND COPOLYMERS OR WITH EVA-COPOLYMERS IN GEL FORM

FIELD OF THE INVENTION

This invention relates to a method for elastifying and extending polymers with EVA copolymers, PVC or PVC copolymers in gel form and to the use of thusly produced compositions.

BACKGROUND OF THE INVENTION

Molding and joint sealing materials based on mixtures of acrylate copolymer dispersions with fillers, pigments and plasticizers have only minimal elastic properties, and the tackiness of the molding materials produced from these mixtures increases with increasing plasticizer fraction. Such molding and joint sealing materials are useful only for a total deformation of about 10%, so that they are unsuitable for sealing a large number of joints in building construction despite their advantageous price.

Furthermore, moisture-curing one-component molding and sealing materials based on MS polymers (from Kaneka) are known. These sealing materials contain as prepolymers the aforementioned MS polymers which are crosslinkable by atmospheric humidity and which are compounds having silyl end groups with at least one hydrolyzable substituent on the silicon atom. Such prepolymers and molding and sealing materials produced therefrom are known from DE-A-40 19 074 and DE-A-38 16 808. The latter specification describes molding and sealing materials produced from these MS polymers at length with reference to further publications. The disclosure content of the two aforementioned specifications is hereby incorporated in full by reference.

Molding and sealing materials based on MS polymers react with moisture from the air to form elastomers, the surface of which is very frequently highly tacky. Therefore, the use of such materials is not possible wherever soiling with dust takes place or is likely.

SUMMARY OF THE INVENTION

It is an object of the present invention to reduce this surface tackiness of molding and sealing materials to such an extent that in the event of contact with dusts of various kinds permanent soiling can be ruled out.

The invention provides the achievement of this object which is discernible in the claims. It consists essentially in adding to the aforementioned molding and sealing materials a gel based on an ethylene-vinyl acetate copolymer (EVA), a polyvinyl chloride homopolymer (PVC) or a vinyl chloride/vinyl acetate copolymer (PVC copolymer and a lasticizer and wax.

DETAILED DESCRIPTION OF THE INVENTION

The use of vinyl acetate homo- and/or copolymers in adhesives and sealants is known per se. For instance, JP 07197010 A/95 describes a two-component sealant composition consisting of an isocyanate component and a low molecular weight hydroxyl-functional acrylate copolymer which contains vinyl acetate as comonomer. This sealant has low surface tackiness. The use of an ethylene-vinyl acetate gel is not disclosed.

JP-A-87/64881 describes a nontacky contact adhesive containing a thermoplastic resin and a plasticizer; the thermoplastic resin may be an ethylene-vinyl acetate copolymer.

EP-A-295 727 describes latices of interpolymers of vinyl acetate, ethylene and a vinyl ester of a tertiary aliphatic carboxylic acid in which the carboxylic acid component contains 9 carbon atoms. These films are notable for low tackiness.

A method for elastifying and extending polymer compositions selected from the group consisting of acrylate copolymer dispersions, reactive polyurethane polymers, MS polymers, polysulfides and silicone rubbers through the addition of EVA gels is not mentioned in any of the aforementioned documents.

The method of the invention is carried out by initially fabricating a gel from EVA, PVC or PVC copolymer, plasticizer and wax and also, optionally, benzoyl chloride or TI additive (from Bayer). The total amount of the plasticizer needed is initially charged to a stirred tank, and then EVA, PVC or PVC copolymer and wax are added with stirring. This mixture is then heated with stirring to about 125° C. and stirred until a clear homogeneous solution is obtained. Stirring is then continued at this temperature for 30 minutes. Subsequently, if desired, 0.1% by weight of benzoyl chloride or TI additive are added. For intermediate storage, this gel is filled into a vessel to be sealed airtight and the intermediate product is then cooled down to room temperature.

In a second operation, the thusly fabricated gel is mixed with the other constituents of the molding or sealing material in a planetary dissolver until homogeneous. These constituents of the molding and sealing materials customarily comprise polymer compositions selected from the group of MS polymers (from Kaneka) or acrylate copolymer dispersions. However, polyurethane polymers, polysulfide polymers or silicone rubbers can be used as well. Suitable MS polymers are described in DE-A-40 19 074 and DE-A-38 16 808 with reference to further publications. The disclosure content of the two last-mentioned documents is hereby incorporated in full by reference.

The molding and sealing materials further contain inorganic fillers such as carbon black, calcium carbonate and pigments such as titanium dioxide and the like and also plasticizers, especially phthalic esters such as diisononyl phthalate or alkylsulfonic acid esters of phenol such as MESAMOLL (from Bayer) or phosphoric esters such as tricresyl phosphate. The materials may finally include customary UV stabilizers and aging inhibitors and also organofunctional silanes, for example 3-glycidyloxypropyl- or 3-aminopropyl-trimethoxysilane or vinyltrimethoxysilane, especially to improve the adhesion to glass, metals, etc.

Particularly the moisture-reactive one-component materials further contain organometallic tin compounds to accelerate the curing, and also moisture scavengers such as carbonyl chlorides, for example benzoyl chloride or TI additive (from Bayer).

The molding and sealing materials based on MS polymers and incorporating the gels of the invention surprisingly exhibit an appreciable reduction in surface tackiness, and this tackiness decreases with increasing EVA copolymer, PVC or PVC copolymer content, despite the associated high plasticizer content. Additionally, an appreciable economic advantage is obtained, since up to about 45% of the original MS polymer fraction can be replaced with the less costly gel.

As mentioned at the beginning, mixtures of acrylate copolymer dispersions with fillers, pigments and plasticizers have only minimal elastic properties, and the tackiness of molding materials produced from these mixtures increases with increasing plasticizer fraction. By adding the inventive EVA, PVC or PVC copolymer gels, optionally in combination with emulsifiers, it is possible to produce elastic molding materials which achieve a total deformation of 25%. Compared with the otherwise customary total deformation of about 10% for acrylate dispersion molding materials, this is an unexpectedly great improvement. Compared with the customary elastic molding materials based on polysulfides, modified silicone rubber, polyurethanes and silicone rubber, such molding materials based on acrylate copolymer dispersions with EVA, PVC or PVC copolymer gels are significantly more economical, given that the other properties such as modulus of elasticity, total deformation and aging resistance are comparable.

The invention is more particularly described by the non-limiting examples hereinbelow.

EXAMPLES 1 TO 3

An EVA gel was prepared from 77 parts of MESAMOLL, 12 parts of EVA polymer (vinyl acetate fraction 40%) and 11 parts of microcrystalline wax by initially charging the entire plasticizer to a stirred tank and then adding EVA polymer and wax with stirring. The temperature was then raised to about 125° C. and the mixture was stirred until a clear homogeneous solution was obtained. This temperature was subsequently maintained for 30 minutes while the stirring was continued. To conclude, 0.1% by weight of TI additive was added, and the mixture was filled into a vessel to be sealed airtight and allowed to cool down to room temperature.

In the examples hereinbelow the commercially available sealant TERSOTAT 930 (total MS polymer and plasticizer content 42.25% by weight) was modified with the above-described EVA gel in such a way that the MS polymer content was replaced with the EVA gel according to the invention in a 5% by weight, 10% by weight and 15% by weight fraction of the polymer content.

microcrystalline wax, except that no TI additive was included.

TABLE 2

| Example | Inv 4 | Inv 5 | Inv 6 |
|---|---|---|---|
| TEROSTAT 930 | 95 | 90 | 85 |
| Additional plasticizer[4] | 0 | 0 | 0 |
| EVA gel[4] | 5 | 10 | 15 |
| Wax mixture | 0 | 0 | 0 |
| Spray value[1] after 1 day | 87 | 102 | 110 |
| Shore A hardness after 14 d | 21 | 16 | 10 |
| Ball test[2] after 1 d | 1 | 1 | 3 |
| Hardening mm/d | 3.1 | 3.1 | 2.7 |
| Tensile strength[3] [$N/mm^2$] | 0.58 | 0.43 | 0.64 |
| Stress value[3] 100% [$N/mm^2$] | 0.45 | 0.35 | 0.52 |
| Breaking extension[3] [%] | 379 | 311 | 329 |

Notes:
[1] on the lines of DIN 52456, flow meter method, i.e., the amount of sealing material is determined which can be expressed from a standard cartridge at a given pressure, time and nozzle diameter (3 bar, 15 sec, 3 mm)
[2] as disclosed on page 8 of DE-A-40 19 074
[3] according to DIN 18545 E
[4] addition instead of an identical fraction of MS polymer As Inventive Examples 1 to 6 reveal compared with the noninventive Comparative Example 1, increasing the fraction of gel in the composition lowers the surface tackiness more and more while the mechanical properties such as tensile strength, stress value and breaking extension remain within what is acceptable. The surface tackiness was determined according to the ball test disclosed on page 8 of DE-A-40 19 074. A high value indicates high tackiness, i.e., a ball of defined circumference will move an inclined plane (defined length) at height H. A sheet of partially cured molding material has been doctor-coated onto this inclined plane in a thickness of about 2 mm.

To examine possible effects of the wax in the EVA gel, Comparative Tests 2 and 3 were carried out. Comparative Test 2 utilizes a wax mixture consisting of 23 parts of wax and 77 parts of MESAMOLL instead of the EVA gel, while in Comparative Test 3 the EVA gel was replaced with an additional plasticizer fraction of 10 parts. In both cases, appreciable surface tackiness as measured by the ball test is observed.

TABLE 1

| Example | Comp 1 | Inv 1 | Inv 2 | Inv 3 | Comp 2 | Comp 3 |
|---|---|---|---|---|---|---|
| TEROSTAT 930 | 100 | 95 | 90 | 85 | 90 | 90 |
| Additional plasticizer[4] | 0 | 0 | 0 | 0 | 0 | 10 |
| EVA gel[4] | 0 | 5 | 10 | 15 | 0 | 0 |
| Wax mixture | 0 | 0 | 0 | 0 | 10 | 0 |
| Spray value[1] after 1 day | 50 | 48 | 32 | 12 | 67 | 150 |
| Spray value[1] after 1 week 40° C. | 32 | 38 | 20 | 10 | 45 | |
| Shore A hardness after 14 d | 26 | 22 | 18 | 14 | 15 | 14 |
| Ball test[2] after 1 d | 40 | 14 | 8 | 0 | 19 | 48 |
| Hardening mm/d | 4 | 4 | 3.5 | 3.4 | 3.5 | 3.6 |
| Tensile strength[3] [$N/mm^2$] | 0.89 | 0.74 | 0.61 | 0.47 | 0.59 | 0.57 |
| Stress value[3] 100% [$N/mm^2$] | 0.49 | 0.42 | 0.34 | 0.27 | 0.27 | 0.27 |
| Breaking extension[3] [%] | 399 | 388 | 364 | 343 | 411 | 378 |

Notes:
[1] on the lines of DIN 52456, flow meter method, i.e., the amount of sealing material is determined which can be expressed from a standard cartridge at a given pressure, time and nozzle diameter (3 bar, 15 sec, 3 mm)
[2] as disclosed on page 8 of DE-A-40 19 074
[3] according to DIN 18545 E
[4] addition instead of an identical fraction of MS polymer

INVENTIVE EXAMPLES 4 to 6

Inventive Examples 1 to 3 were repeated to prepare a PVC copolymer gel from 85 parts of MESAMOLL, 8 parts of PVC copolymer (vinyl acetate fraction 5%) and 7 parts of In summary it is to be noted that the EVA or PVC copolymer gels in the abovementioned sealant formulations bring about the typical character of a plasticizer with regard to the mechanical properties, but effect exactly the opposite of an increased plasticizer fraction with regard to surface tackiness and processing viscosity.

INVENTIVE EXAMPLE 7 AND COMPARATIVE EXAMPLE 4

Inventive Example 1 was repeated to prepare a gel from 88 parts of diisobutyl phthalate (DIBP), 3 parts of EVA polymer (vinyl acetate fraction 28%) and 9 parts of PVC copolymer (vinyl acetate fraction 5%), but without addition of TI additive.

The commercially available sealant TEROSTAT 20 (total acrylic copolymer dispersion and plasticizer content 42% by weight) was modified according to the invention by adding the gel according to the invention in such an amount that 6% of the dispersion content and 20% of the chalk/pigment fraction were replaced.

TABLE 4

| Example | Comp 4 | Inv 7 |
|---|---|---|
| TEROSTAT 20 | 100 | 60 |
| Acrylic dispersion/plasticizer fraction | 42 | 26 |
| EVA/PVC copolymer gel | 0 | 40 |
| Total deformation[1] [%] | about 10 | 25 |
| Rebound from 150% extension[2] [%] | cohesive fracture | about 71 |
| Stress value[3] 100% [N/mm$^2$] | 0.15 | 0.03 |
| Extension [%] | <140 | >150 |

Notes
[1] on the lines of DIN 52455
[2] on the lines of DIN 52458
[3] according to DIN 18545 E As Inventive Example 7 reveals in comparison with noninventive Comparative Example 4, the addition of the gel according to the invention improves the mechanical properties such as stress value, extension, rebound and total deformation to such an extent that the requirements of DIN 18540 (test conditions for building expansion joint sealants) are almost achieved.

In summary it is to be noted that the EVA/PVC copolymer gels in the sealant formulation as per Inventive Example 7 based on acrylic copolymer dispersion bring about the typical character of a plasticizer with regard to the mechanical properties, but do not exhibit any adverse effects with regard to surface tackiness in comparison with noninventive Comparative Example 4.

We claim:

1. A joint sealer, adhesive or sealant composition comprising:
    (a) a polymer member comprising at least one polymer selected from group consisting of acrylate copolymer disperslons, reactive polyurethane polymers, polymers having silyl end groups containing at least one hydrolyzable substituent, polysulfides and silicone rubbers; and
    (b) a pre-formed, homogenous gel composed of
        (i) at least one member selected from the groups consisting of PVC homopolymers, PVC copolymers, and EVA copolymers;
        (ii) at least one gel plasticizer; and
        (iii) wax.

2. The composition of claim 1 wherein the polymer member (a), additionally comprises at least one additive selected from the group consisting of plasticizers, fillers, pigments, aging inhibitors and adhesion promoters.

3. The composition of claim 1 wherein the gel plasticizer comprises at least one member selected from the groups consisting of phthalic esters, alkyl sulfuric acid esters phenol, and phosphoric esters.

4. The composition of claim 1 wherein the polymer member is moisture-reactive and the composition additionally comprises a moisture scavenger.

5. The composition of claim 1 wherein the pre-formed, homogeneous gel additionally comprises benzoyl chloride or TI additive.

6. The composition of claim 1 wherein the wax comprises microcrystalline wax.

7. The composition of claim 1 wherein said pre-formed, homogeneous gel comprises from 5 to 40% by weight of the composition.

8. The composition of claim 1 wherein said pre-formed, homogeneous gel comprises from 5 to 15% by weight of the composition.

9. A method of making a polymer member elastitfying and extending gel, said method comprising the steps of:
    (a) charging a plastcizer to a tank;
    (b) adding at least one member selected from the groups consisting of PVC homopolymers, PVC copolymers and EVA copolymers, and wax to the tank with stirring to form a mixture;
    (c) heating said mixture until a clear homogeneous solution is obtained; and
    (d) cooling the clear homogeneous solution to obtain said gel.

10. The method of claim 9, wherein benzoyl chloride or TI additive is added to the tank after step (a).

11. The method of claim 9, comprising an additional step of storing the gel in a sealed airtight vessel.

12. The method of claim 9, comprising an additional step of adding a moisture scavenger to the tank.

13. A method of elastifying and extending a polymer member comprising at least one polymer selected from the group consisting of acrylate copolymer dispersions, reactive polyurethane polymers, polymers having silyl end groups containing at least one hydrolyzable substituent, polysulfides and silicone rubbers, said method comprising: mixing with said polymer member a pre-formed, homogeneous gel comprised of (i) at least one member selected from the group consisting of PVC homopolymers, PVC copolymers and EVA copolymers, (ii) a gel plasticizer and (iii) wax.

14. The method of claim 13 wherein the gel additionally comprises benzoyl chloride or TI additive.

15. The method of claim 13 wherein said polymer member and said gel have a combined weight of 100 parts, wherein, said polymer member being 60 to 95 parts and said gel being 5 to 40 parts.

16. The method of claim 13 wherein the gel plasticizer comprises at least one member selected from the group consisting of phthalic esters, alkylsulfonic acid esters of phenol, and phosphoric esters.

17. The method of claim 13 wherein the polymer member is moisture-reactive and the gel additionally comprises a moisture scavenger.

18. The method according to claim 13 wherein the polymer member additionally comprises at least one additive selected from the group consisting of plasticizers, fillers, pigments, aging inhibitors and adhesion promoters.

19. The method according to claim 13 wherein said pre-formed, homogeneous gel comprises, by weight, 77% to 88% plasticizer, 3% to 12% of at least one polymer selected from the group consisting of PVC homopolymers, PVC copolymers and EVA copolymers, and 7% to 11% wax.

20. A method according to claim 13 wherein the preformed, homogeneous gel is produced by a process which comprises:

(a) charging a plasticizer to a tank;

(b) adding at least one polymer selected from the group consisting of PVC homopolymers, PVC copolymers and EVA copolymers and wax to the tank with stirring to form a mixture;

(c) heating said mixture until a clear homogeneous solution is obtained; and (d) cooling the clear homogeneous solution to obtain said gel.

* * * * *

UNITED STATES PATENT AND TRADEMARK OFFICE
CERTIFICATE OF CORRECTION

PATENT NO. : 6,593,405 B1  Page 1 of 1
APPLICATION NO. : 09/554061
DATED : July 15, 2003
INVENTOR(S) : Schaetzle et al.

It is certified that error appears in the above-identified patent and that said Letters Patent is hereby corrected as shown below:

Title page, (73) Assignee, delete "Henkel Kommanditgesellschaft auf Aktien, Duesseldorf (DE)" and insert therefor --Henkel-Teroson GmbH, Heidelberg (DE)--.

Column 5, line 56, delete "disperlons" and insert therefor --dispersions--.

Column 6, line 5, insert --of-- after "acid esters".

Column 6, line 21, delete "elastitfying" and insert therefor --elastifying--.

Column 6, line 23, delete "plastcizer" and insert therefor --plasticizer--.

Signed and Sealed this

Twenty-first Day of November, 2006

JON W. DUDAS
*Director of the United States Patent and Trademark Office*